United States Patent
Kim et al.

(10) Patent No.: US 6,960,543 B2
(45) Date of Patent: *Nov. 1, 2005

(54) FIRE-RESISTANT PANEL COMPRISING LOESS AND FIRE-RESISTANT DECORATIVE PANEL USING THE SAME

(75) Inventors: Kwang-Min Kim, Cheongju (KR); Wan-Ho Song, Taejeon (KR); Hyoung-Yool Kim, Taejeon (KR)

(73) Assignee: LG Chem, Ltd., Seoul (KR)

( * ) Notice: Subject to any disclaimer, the term of this patent is extended or adjusted under 35 U.S.C. 154(b) by 146 days.

This patent is subject to a terminal disclaimer.

(21) Appl. No.: 10/220,478

(22) PCT Filed: Dec. 28, 2001

(86) PCT No.: PCT/KR01/02289

§ 371 (c)(1), (2), (4) Date: Aug. 28, 2002

(87) PCT Pub. No.: WO02/053372

PCT Pub. Date: Jul. 11, 2002

(65) Prior Publication Data

US 2003/0022577 A1 Jan. 30, 2003

(30) Foreign Application Priority Data

Dec. 29, 2000 (KR) .......................................... 2000-85422
Nov. 9, 2001 (KR) .......................................... 2001-69636

(51) Int. Cl.$^7$ .............................. B32B 27/04; B27N 9/00
(52) U.S. Cl. ..................... 442/136; 442/70; 442/172; 442/180; 442/181; 442/252; 442/247; 428/920; 428/921
(58) Field of Search ................. 442/70, 136, 172, 442/180, 181, 252, 247, 255; 428/920, 921

(56) References Cited

U.S. PATENT DOCUMENTS

| | | | | |
|---|---|---|---|---|
| 6,333,280 B1 | * | 12/2001 | Hashimoto et al. | ........... 442/70 |
| 6,410,122 B1 | * | 6/2002 | Tono et al. | ................. 428/212 |
| 2004/0192139 A1 | * | 9/2004 | Pallach et al. | .............. 442/327 |

FOREIGN PATENT DOCUMENTS

| | | | | |
|---|---|---|---|---|
| KR | 9102530 B | * | 7/1987 | ........... C04B/14/10 |
| KR | 1998-66205 A | | 10/1998 | |
| KR | 2001-69165 A | | 7/2001 | |
| KR | 2001-246513 Y | | 10/2001 | |
| SU | 440392 A | * | 11/1972 | ........... C08G/37/28 |
| WO | WO 98/09816 A1 | | 3/1998 | |
| WO | WO 02/053372 | * | 7/2002 | ........... B23B/17/04 |
| WO | WO 02/053373 | * | 7/2002 | ........... B23B/17/04 |

* cited by examiner

Primary Examiner—Elizabeth M. Cole
Assistant Examiner—Lynda M. Salvatore
(74) Attorney, Agent, or Firm—Alston & Bird LLP (57) ABSTRACT

The present invention relates to a fire-resistant panel having superior fire-resistance and a low dimensional change, and it also relates to a fire-resistant decorative panel using the same. More specifically, a fire-resistant panel comprising: a) a substrate material of a woven or nonwoven fabric of inorganic fiber, or a paper; and b) a resin compound containing the following materials which are impregnated or coated onto the substrate material set forth in a): i) a thermosetting resin selected from the group consisting of a phenol resin, a modified phenol resin, a modified phenol-urea resin, a melamine resin, a modified melamine resin, a modified melamine-urea resin, a urea resin, and a modified urea resin; and ii) loess is provided. The present invention also provides a fire-resistant decorative panel using the fire-resistant panel as a substrate material.

32 Claims, 3 Drawing Sheets

FIRE-RESISTANT PANEL COMPRISING LOESS AND FIRE-RESISTANT DECORATIVE PANEL USING THE SAME

BACKGROUND OF THE INVENTION (a) Field of the Invention

The present invention relates to a fire-resistant panel, and more particularly, to a fire-resistant panel that can be used in various applications such as for materials for walls of subway stations, washrooms and kitchens, building interior or exterior materials for ceilings and floors, floor of passenger cars, interior materials, and for furniture, the fire-resistant panel having excellent fire-resistance and a low dimensional change. The present invention also relates to a fire-resistant decorative panel using the fire-resistant panel.

(b) Description of the Related Art

A common melamine-based decorative plate is generally formed by pressing a plurality of layers consisting of a surface protective layer and a decoration layer both impregnated by a melamine resin, and a core layer impregnated by a phenol resin onto kraft paper, using a multi-stage press at an elevated temperature under a high pressure. However, these decorative plates have drawbacks of being thermally weak due to their high content of resins and pulp layers.

Therefore, in order to meet the requirement of fire-resistance for materials used as building interior and exterior materials, furniture, and the like, ground stone or processed metals are used, and alternately, tiles made of ceramics or porcelain are attached to the surface. Though these materials have good durability and fire-resistance, they have drawbacks of a high manufacturing cost, a heavy weight, and low workability; and furthermore there is limitation for their use as colorful decoration.

Figure 1:
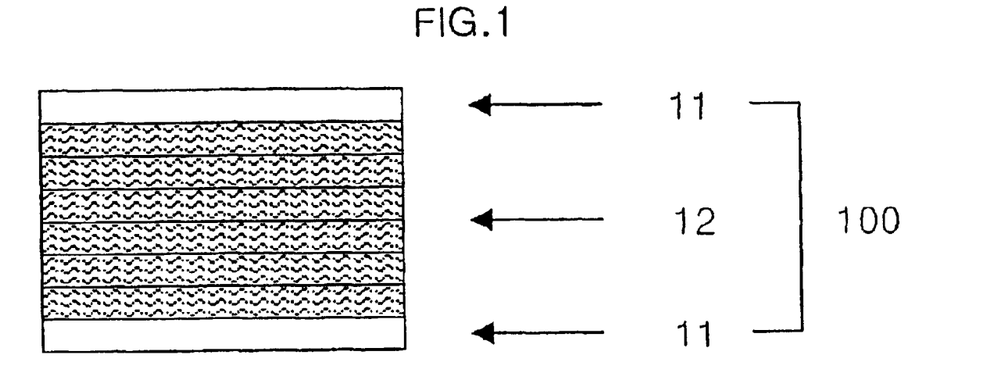
FIG. 1 is a sectional view of a conventional fire-resistant decorative material.
Figure 2:
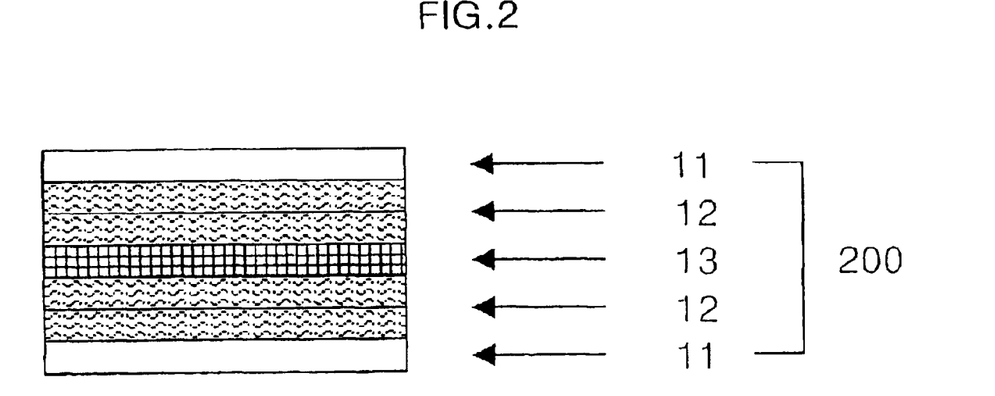
FIG. 2 is a sectional view of a conventional fire-resistant decorative panel.
Figure 3:
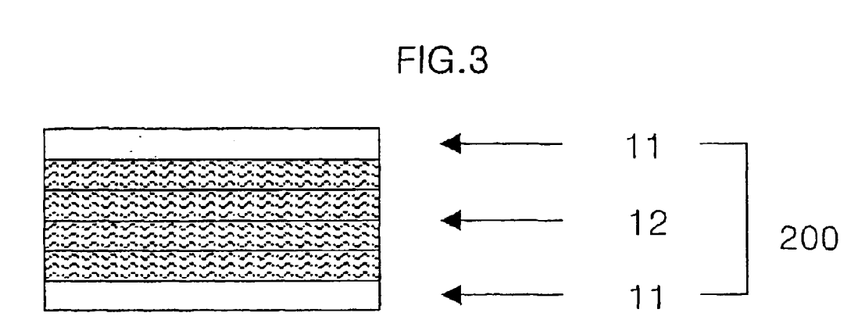
FIG. 3 is a sectional view of another conventional fire-resistant decorative panel.

In order to solve the above-mentioned problems, fire-resistant melamine-based decorative materials comprising a specific inorganic compound in their core-material layer have been proposed, examples of which can be found in Japanese Patent Pub. Nos. 03-253342 (FIG. 1), 11-268186 (FIG. 2), 10-305527 (FIGS. 2 and 3), 10-305525 (FIGS. 2 and 3), etc. These decorative panels have a multi-layered configuration consisting of, from top to bottom, a sheet for a decorative layer using a patterned substrate and a melamine resin, a basic material layer made by blending an inorganic filler such as a nonwoven glass fabric and aluminum hydroxide with a melamine resin or a phenol resin and by impregnating or coating, a reinforcing layer made by blending and impregnating a nonwoven glass fabric with a melamine resin or a phenol resin, another basic material layer and another decorative layer. These layers are molded with a multi-stage press at a high temperature under a high pressure.

However, although such conventional fire-resistant melamine-based decorative panels exhibit improved fire-resistance compared with common melamine-based decorative panels, there are still problems in that their fire-resistance and dimensional stability are insufficient because a large amount of resin is used in order to improve strength and processability of the decorative panels and their manufacturing cost is increased due to the use of inorganic filler such as aluminum hydroxide.

SUMMARY OF THE INVENTION

Taking into consideration of the problems of the prior arts, an object of the present invention is to provide a fire-resistant panel having excellent fire-resistance and dimensional stability; and also to provide a fire-resistant decorative panel using the same.

Another object of the present invention is to provide a fire-resistant panel comprising an inorganic filler that is capable to impart superior workability upon the resin, and to provide a fire-resistant decorative panel using the same.

Yet another object of the present invention is to provide a fire-resistant panel comprising an inorganic filler that is capable to impart superior strength, and to provide a fire-resistant decorative panel using the same.

In order to achieve these objects and others, the present invention provides a fire-resistant panel comprising:

a) a substrate material of a woven or nonwoven fabric of inorganic fiber, or a paper; and b) a resin compound containing the following materials which are impregnated or coated onto the substrate material set forth in a):

i) a thermosetting resin selected from the group consisting of a phenol resin, a modified phenol resin, a modified phenol-urea resin, a melamine resin, a modified melamine resin, a modified melamine-urea resin, a urea resin, and a modified urea resin; and    ii) loess.

Further, the present invention provides a fire-resistant decorative panel comprising:

a) a decoration layer formed by impregnating or coating a thermosetting resin onto a patterned substrate; and b) a core-material layer formed by impregnating or coating a substrate material of a woven or nonwoven fabric of inorganic fiber, or a paper, with a resin compound which contains an inorganic filler having loess as a main component and a thermosetting resin selected from the group consisting of a phenol resin, a modified phenol resin, a modified phenol-urea resin, a melamine resin, and a modified melamine resin, a modified melamine-urea resin, a urea resin, and a modified urea resin.

BRIEF DESCRIPTION OF THE DRAWINGS

Reference numbers are used such that 11 denotes decorative layer, 12 denotes core-material layer, 13 denotes reinforcing layer, 21 denotes decoration layer, 100 denotes fire-resistant decorative material, 200 denotes fire-resistant decorative plate, and 300 denotes fire-resistant decorative panel.

DETAILED DESCRIPTION OF THE PREFERRED EMBODIMENTS

The present invention will be explained more specifically in the following.

The present invention provides an integrated fire-resistant panel formed by impregnating or coating on a substrate of woven or nonwoven fabric made from an inorganic fiber such as glass fiber or alumina fiber, or a paper, with a resin compound including an inorganic filler having loess as a main component; a thermosetting resin selected from the group consisting of a phenol resin, a modified phenol resin, a modified phenol-urea resin, a melamine resin, a modified melamine resin, a modified melamine-urea resin, a urea resin, and a modified urea resin; and a good fire retardant.

The present invention also provides a fire-resistant decorative panel having a patterned substrate integrated by superposing and molding under high temperature and pressure on a surface and/or a rear face of a laminated sheet substrate having a plurality of these fire-resistant panels that are used as substrate materials, the patterned sheet being impregnated with a thermosetting resin such as a melamine resin. The decorative panel may have a reinforcing layer interposed between the core-material layer and the decoration layer, or between each of the core-material layers, the reinforcing layer being formed by impregnating or coating a woven fabric of inorganic fiber with a resin compound of a modified melamine resin or a modified phenol resin.

The core-material layer and the reinforcing layer may be used in single or multiple layers, the configuration of which can be varied according to the application and thickness thereof. Particularly, if they are used as a wall body, they are preferably prepared to have a thickness of 2 to 5 mm, and in this case the number of core-material layers may be 3 to 100 sheets and the number of reinforcing layers may be 1 to 20 sheets depending on the necessity.

When the fire-resistant panel is formed into a fire-resistant decorative panel, it may be subjected to various methods of decoration. The decoration methods include, as typical examples, coating the surface of the fire-resistant panel with paint and the like, and impregnating or coating the decoration layer with a thermosetting resin and the like as described above and then attached the treated layer to the surface of the fire-resistant panel. The decorative panel may be specifically named a melamine decorative panel, a phenol decorative panel, an acryl-based decorative panel, or a urethane-based decorative panel in accordance with the kind of resin contained in the finish coat applied or the kind of thermosetting resin impregnated in the decoration layer such as melamine resin, phenol resin, acryl resin, or urethane resin.

A decorative panel more suitable for use of a fire-resistant panel of the present invention, considering that the fire-resistant panel uses a thermosetting resin, is made by superposing a decoration layer impregnated or coated with a thermosetting resin and the like on the surface of a patterned paper, and then heat-pressing to effect attachment.

The types of decorative panels according to the invention are described in the following.

As a first type, a fire-resistant decorative panel using loess comprises, from top to bottom:
  i) a decoration layer; and
  ii) a plurality of core-material layers.

As a second type, a fire-resistant decorative panel using loess comprises, from top to bottom (FIG. 5):
  i) a decoration layer;
  ii) a plurality of core-material layers; and
  iii) a decoration layer.

As a third type, a fire-resistant decorative panel using loess comprises, from top to bottom (FIG. 4):
  i) a decoration layer;
  ii) a plurality of core-material layers;
  iii) a reinforcing layer;
  iv) a plurality of core-material layers; and
  v) a decoration layer.

As a fourth type, a fire-resistant decorative panel using loess comprises, from top to bottom (FIG. 6):
  i) a decoration layer;
  ii) a reinforcing layer;
  iii) a plurality of core-material layers;
  iv) a reinforcing layer; and
  v) a decoration layer.

In addition of the above types, a fire-resistant decorative panel according to the present invention can be prepared by means of various configuration of layers, and it is not to be limited to the above types.

In the following, the above layers are explained, respectively.

The core-material layer of a fire-resistant panel or a fire-resistant decorative panel according to the present invention is a sheet shaped layer formed by impregnating or coating a substrate material of a woven or nonwoven fabric of inorganic fiber or a paper, with a resin compound which contains an inorganic filler having loess as a main component and a thermosetting resin selected from a group consisting of a phenol resin, a modified phenol resin, a modified phenol-urea resin, a melamine resin, a modified melamine resin, a modified melamine-urea resin, a urea resin, and a modified urea resin.

The substrate material for the core-material layer is preferably a woven or nonwoven fabric of inorganic fibers such as glass fiber or alumina fiber, or a paper such as kraft paper. Particularly, a preferred substrate material is a nonwoven fabric of glass fiber that is made by chopping a glass fiber having a composition of E-glass with a fiber diameter of 6 to 30 μm into a length of 10 to 50 mm using a needling machine, and then by blending a binder such as an epoxy resin, an acryl resin, or a polyvinyl alcohol resin therein.

The substrate material preferably has weight per unit area of 30 to 200 g/m$^2$. When the weight per unit area is less than 30 g/m$^2$, problems may be caused during impregnating, coating, forming or handling due to insufficient strength of the decorative panel made. On the other hand, when the weight per unit area exceeds 200 g/m$^1$, the panel becomes hard and efficiency of impregnation or coating as well as workability is lowered.

It is preferred that the resin compound of modified melamine resin or modified phenol resin impregnated into the substrate material for the core-material layer comprises:
  i) 3.0% to 10.0% by weight (based on solid mass) of a first condensate of melamine or phenol resin;
  ii) 50% to 80% by weight of loess;
  iii) 1.0% to 5.0% by weight of fire retardant; and
  iv) 10% to 40% by weight of solvent (water or alcohol).

Specifically, when the compound contains not more than 5% by weight of the modified melamine resin or modified phenol resin and more than 4.0% by weight of the fire retardant, it can be classified as Grade 1 for a fire-resistance test according to Korean Standard No. KS F 2271 entitled "Testing method for incombustibility of internal finish materials and elements of building."

In the resin compound, a part of the loess to be used as an inorganic filler may be replaced by aluminum hydroxide, magnesium hydroxide, talc, or the like in order to improve workability after the process of press-forming.

In such a case, the composition of the resin compound comprises:

i) 3.0% to 10.0% by weight (based on solid mass) of a first condensate of melamine or phenol resin;

ii) 40% to 70% by weight of loess;

iii) 3% to 20% by weight of an alternative inorganic filler such as aluminum hydroxide, magnesium hydroxide or talc;

iv) 1.0% to 5.0% by weight of fire retardant; and v) 10% to 40% by weight of solvent (water or alcohol).

The resin compound may be used as it is or with the addition of a diluent such as water or alcohol. The amount of the resin compound to be impregnated (or coated) is preferably 400 to 2000 parts by weight based on 100 parts by weight of the substrate material. If the impregnated amount is less than 400 parts by weight, more sheets are required to adjust the specified thickness and the cost will be increased, whereas if the amount exceeds 2000 parts by weight, drying time is extended to thereby lower the productivity, and inter-layer adhesive strength after press-forming may also become weak.

The modified melamine resin and modified phenol resin are liquid-phase resins, and they are the first condensates prepared by a usual polymerization process using 25% to 45% by weight of melamine or phenol, 30% to 60% by weight of formaldehyde, 2% to 5% by weight of a plasticizer and 10% to 25% by weight of distilled water as a solvent. In the case of using the melamine resin, a curing agent may be further added in order to reduce the time required for curing.

As the fire retardant, a liquid phase fire retardant containing phosphor and nitrogen and a solid phase fire retardant, dicyandiamide, may be used in combination. The charging method is preferably carried out by adding 100 parts by weight of the first condensate, 15 to 30 parts by weight of fire retardant containing phosphor/nitrogen, and 5 to 10 parts by weight of dicyandiamide as a solid phase fire retardant. By means of addition of these fire retardants, the resin will acquire fire-resistant properties.

A preferable example of the liquid phase fire retardant containing phosphor and nitrogen is Melflam 131 A (product of SKW Trostberg, Germany), which is an aqueous solution containing nitrogen and phosphor and which contains 35% to 45% by weight of active components. A function of this fire retardant is to produce polymerized polyphosphoric acid by promoting thermal polycondensation of polyphosphoric acid if the decorative panel is subjected to a high temperature when a fire breaks out, and the thus-produced polymeric polyphosphoric acid will then act as a dehydrogenation catalyst to form charcoal, and thereby oxygen and heat will be interrupted and superior nonflammable effects are thence exhibited. Further, many kinds of nitrogen components contained in the melamine resin also assist in the production of polymeric polyphosphoric acid. When such a liquid phase fire retardant containing phosphor and nitrogen is used together with dicyandiamide as a solid phase fire retardant, the effect will be doubled by virtue of fire-resistant synergism.

Dicyandiamide is a solid and it reacts with various materials contained in the resin compound such as formaldehyde, water, and ammonium salt to change them into a nonflammable substance, thereby resulting in fire-resistant effects that exclude the ability of the decorative panel to burn if it is subjected to a high temperature when a fire breaks out. Particularly, when it is used together with a liquid phase fire retardant containing phosphor and nitrogen, the effect will be doubled by virtue of fire-resistant synergism as previously noted.

Loess as an inorganic filler does not transfer heat if the decorative panel is subjected to a high temperature when a fire breaks out, and additionally the water of crystallization contained within the loess component absorbs heat to provide a fire-resistant effect. Furthermore, loess effects a uniform heat transfer to the resin during the formation of the decorative panel under a condition of high temperature and high pressure, and it provides good adhesion between each layer.

In general, loess is known to have pharmaceutical efficacy such as detoxifying potential or antibacterial effects, and it is widely used as a purifying agent against environmental pollutants, for cosmetic materials and as therapeutics for folk remedies. As loess has a capability of infrared irradiation in addition to its conventional uses, it can provide a warming effect to the human body as well as thermal insulation to buildings when it is included within the decoration panel according to the present invention.

Loess used in the present invention exhibits different colors such as white, yellow or red depending on the district of its origin, and it is found in Korea at Sancheong in Gyeongsangnam-do, Chongdo in Gyeongsangbuk-do, Gurye or Hwasun in Jeollanam-do and Buan in Jeollabuk-do is particularly preferred. Preferably, the loess has a composition of 10% to 90% by weight of silicon dioxide, 10% to 80% by weight of aluminum oxide, 0.1% to 50% by weight of iron oxide, 0.1% to 30% by weight of magnesium oxide, 0.1% to 50% by weight of calcium oxide, 0.1% to 30% by weight of potassium oxide, 0.1% to 5% by weight of mineral oxide and inorganic material, 0% to 5% by weight of moisture and 0.1% to 20% by weight of impurities as a remainder.

Loess used in the present invention may be natural loess itself or a calcined loess which has been treated by calcining at a temperature of 300° to 1000° C. Such calcined loess is obtained by eliminating organic compounds contained therein and then by reducing irregularly scattered micropores as well as water of crystallization to a certain level. Such calcined loess can be used in further increased quantities because it has a reduced amount of oil absorption during blending with resin, thus providing better fire-resistant properties.

The particle size distribution of loess used as an inorganic filler in the present invention is preferably 5 to 300 µm, while its mean particle size is preferably 10 to 50 µm. If loess with particle size below the above range is used, the viscosity of the resin will become high due to strong oil absorptivity of resin and solvent so that efficiency of impregnation or coating workability is lowered. On the other hand, if loess with a particle size of over the above range is used, smoothness of the panel surface may be reduced by the presence of large particles on the surface during the formation of the decorative panel under a condition of high temperature and high pressure after impregnation or coating.

The particle size of the alternative inorganic filler such as aluminum hydroxide, magnesium hydroxide or talc which is used to replace a part of the loess is preferably in the range of 10 to 50 µm. If an inorganic filler with a particle size below the above range is used, the resin viscosity will become high due to strong oil absorptivity of resin and solvent so that workability is lowered. On the other hand, if an inorganic filler with a particle size of over the above range is used, smoothness of panel surface may be reduced by the presence of large particles on the surface after the product is formed.

The decorative panel according to the present invention can be made to have a reinforcing layer interposed between the core-material layer and the decoration layer, or between each core-material layers, wherein the reinforcing layer is formed by impregnating or coating a woven or nonwoven fabric of inorganic fiber such as glass fiber and alumina fiber, or kraft paper with modified melamine resin or modified phenol resin. The woven fabric of inorganic fiber used as a substrate material for the reinforcing layer is preferably a woven fabric of glass fiber having an E-glass composition, made by means of a weaving machine.

In the case the substrate material of the reinforcing layer is woven fabric, its weight per unit area is preferably in the range of 30 to 150 $g/m^2$. If the weight per unit area is less than 30 $g/m^2$, the thickness of the fiber will not be sufficient such that it will be too pliable and its handling and workability during lamination will be poor. On the other hand, if the weight per unit area is more than 150 $g/m^2$, the fiber will become too thick such that marks of the fibers may be transcribed to the surface of the panel upon production, and the adhesive strength will become too weak such that separation of the layers may occur. In the case the substrate material of the reinforcing layer is kraft paper, its weight per unit area is preferably 70 to 300 $g/m^2$. If the weight per unit area is less than 70 $g/m^2$, workability such as impregnation and lamination will become worse, and on the other hand, if the weight per unit area is more than 300 $g/m^2$, it will be difficult to adjust thickness required in the panel production and the adhesive strength between upper and lower layers will become too weak such that separation of the layers may occur.

The reinforcing layer is prepared by impregnating (or coating) 100 parts by weight of a woven fabric of inorganic fiber or kraft paper with 50 to 500 parts by weight of the compound of modified melamine resin or modified phenol resin which is used in the core-material layer. Alternatively, impregnation can be carried out with 50 to 200 parts by weight of modified melamine resin alone or modified phenol resin alone, both containing no inorganic loess filler. However, the greater the amount of resin used, the worse the fire-resistance will be.

The decoration layer used for a surface and a rear face of the melamine-based decorative panel according to the present invention has a sheet shape, and it comprises a thermosetting resin sheet made by impregnating or coating 100 parts by weight of a paper substrate having a weight per unit area of 40 to 200 $g/m^2$. The substrate is made of synthetic pulp, wood, textile fabrics, organic synthetic fiber and the like with 50 to 200 parts by weight of a resin such as melamine resin, phenol resin, acryl resin and urethane resin. When an inorganic component such as titanium oxide is blended in the substrate material of the decoration layer, fire-resistance may be enhanced, and using a lesser amount of resin is advantageous for fire-resistance.

The sheets for core-material layers and reinforcing layers produced as described above are used in a plural numbers in consideration of panel thickness, with a single sheet of the decoration layer being used for the surface and the rear face, respectively. These sheets are heated and pressed in a multi-stage press, and thereby a fire-resistant decorative panel comprising loess according to the present invention is produced. In order to impart an embossing effect to the surface, a mirror plate, embossed plate, or the like may be superposed on the product surface during forming, and a protective film may be attached after forming to prevent the surface of the product from being scratched.

The fire-resistant decorative panel according to the present invention is designed for attachment in such a manner that the decoration layer is oriented to face outward in order to enable the decorative surface to be seen from outside.

The fire-resistant decorative panel according to the present invention itself can be attached to cement walls, steel plates, wood and the like by means of an adhesive, etc. Since the fire-resistant decorative panel of the invention exhibits a low dimensional change, deformation is not caused even when a rear substrate such as a polyvinyl chloride (PVC) sheet, plywood, a medium density fiber board (MDF), and a high density fiber board (HDF) is separately attached to its rear face, depending on its usage.

As the fire-resistant decorative panel has excellent fire-resistance and a low dimensional change, it is a suitable for walls of subway stations, washrooms and kitchens, building interior or exterior materials for ceilings and floors, floor of passenger cars, interior materials, and for furniture.

The present invention will be described in further detail with reference to the following examples and comparative examples. However, the examples are intended to be illustrative of the present invention, and the present invention is not to be limited to them.

EXAMPLES

Example 1

(Preparation of a Compound of a Fire-Resistant Melamine Resin and Loess for a Core-Material Layer and a Reinforcing Layer)

1.7 mol of formaldehyde was added to 1 mol of melamine and the mixture was reacted at 95° C. under a weak alkaline condition, and then the content of the reagents was controlled by adding a plasticizer and water to obtain an initial condensation product. 0.1 parts by weight of paratoluenesulfonic acid (PTSA) as a hardener and 0.1 parts by weight of Melpers RH4 (product of SKW Trostberg, Germany) as a potential hardener were added to 100 parts by weight of this initial condensation product to obtain a melamine resin. 20 parts by weight of Melflam 131A as a liquid fire retardant and 4.0 parts by weight of dicyandiamide as a solid fire retardant were added to 100 parts by weight of the melamine resin to obtain a fire-resistant melamine resin.

900 parts by weight of loess having an average particle size of 10 to 50 $\mu m$ were added to 100 parts by weight of the above-obtained fire-resistant melamine resin to prepare a resin compound of fire-resistant melamine resin and loess.

(Preparation of a Core-Material Layer Sheet)

Nonwoven fabric of E-glass fiber with a weight per unit area of 110 $g/m^2$ obtained by treatment of the above resin compound of fire-resistant melamine resin and loess with acryl resin-based binder was impregnated and it was dried to prepare a core-material layer sheet having a degree of impregnation of 800% by weight based on dry weight.

(Preparation of a Reinforcing Layer Sheet)

Nonwoven fabric of E-glass fiber with a weight per unit area of 60 $g/m^2$ was impregnated with the above compound of fire-resistant melamine resin and loess, and it was dried to prepare a reinforcing layer sheet of 300% by weight based on dry weight.

(Preparation of a Melamine Resin for Decoration Layer)

1.7 mol of formaldehyde was added to 1 mol of melamine and the mixture was reacted at 95° C. under a weak alkaline condition, and then the content of the reagents was controlled by adding water to obtain an initial condensation product. 0.2 parts by weight of paratoluenesulfonic acid (PTSA) as a hardener and 0.2 parts by weight of Melpers RH4 (product of SKW Trostberg, Germany) as a potential hardener (a hardener which promotes reaction exclusively at a high temperature) were added to 100 parts by weight of this initial condensation product to prepare a melamine resin.

(Preparation of a Decoration Layer Sheet)

The above-obtained melamine resin was impregnated to 90% by weight into printed patterned paper of 80/m² into which titanic oxide was incorporated, and a decoration layer sheet was obtained.

Figure 4:
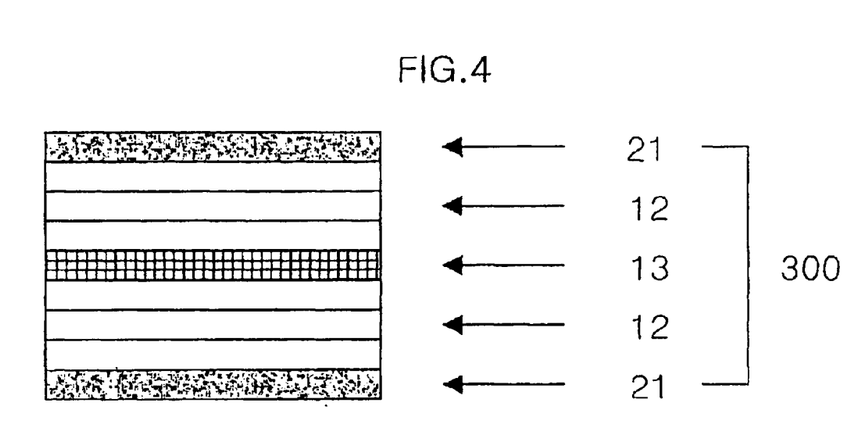
FIG. 4 is a sectional view of a fire-resistant decorative panel according to the present invention, wherein loess is used.

(Preparation of a Fire-Resistant Melamine Decorative Panel: FIG. 4)

The above-obtained sheets were stacked from top to bottom in the order of 1 sheet of the decoration layer, 3 sheets of the core-material layer sheet, 1 sheet of the reinforcing layer sheet, 3 sheets of the core-material layer sheet, and 1 sheet of the decoration layer, and then a mirror plate of stainless steel was superposed on both sides. It was all subjected to heat-pressing at a temperature of 150° C. and a pressure of 100 kgf/cm² for 30 minutes, and thus a fire-resistant melamine decorative panel having a thickness of 3 mm was prepared.

Example 2

(Preparation of a Compound of a Fire-Resistant Phenol Resin and Loess for a Core-Material Layer)

1.4 mol of formaldehyde was added to 1 mol of phenol and the mixture was reacted at 100° C. under a weak alkaline condition, and then the content of the reagents was controlled by adding water to obtain an initial condensation product. 20 parts by weight of Melflam 131A as a liquid fire retardant and 4.0 parts by weight of dicyandiamide as a solid fire retardant were added to 100 parts by weight of this initial condensation product to obtain a fire-resistant phenol resin.

900 parts by weight of loess having an average particle size of 10 to 50 μm was added to 100 parts by weight of the above-obtained fire-resistant phenol resin to prepare a compound of fire-resistant phenol resin and loess.

(Preparation of a Core-Material Layer Sheet)

Nonwoven fabric of E-glass fiber with a weight per unit area of 110 g/m² obtained by treatment with acryl resin-based binder was impregnated with the above compound of fire-resistant phenol resin and loess, and it was dried to prepare a core-material layer sheet having a degree of impregnation of 800% by weight based on dry weight.

(Preparation of a Decoration Layer Sheet)

A decoration layer sheet as in Example 1 was prepared.

Figure 5:
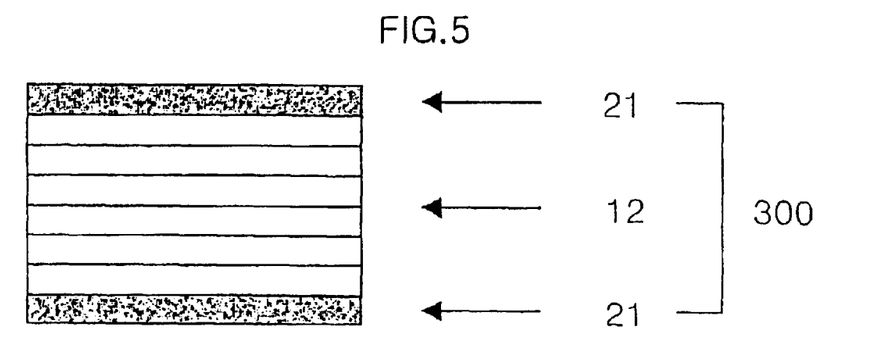
FIG. 5 a sectional view of a fire-resistant decorative panel according to the present invention, wherein loess is used.

(Preparation of a Fire-Resistant Melamine Decorative Panel: FIG. 5)

The above-obtained sheets were stacked from top to bottom in the order of 1 sheet of the decoration layer, 6 sheets of the core-material layer sheet, and 1 sheet of the decoration layer, and then a mirror plate of stainless steel was superposed on both sides. It was all subjected to heat-pressing at a temperature of 150° C. and a pressure of 100 kgf/cm² for 30 minutes, and thus a fire-resistant melamine decorative panel having a thickness of 3 mm was prepared.

Example 3

(Preparation of a Core-Material Layer Sheet)

A core-material layer sheet as in Example 1 was prepared.

(Preparation of a Reinforcing Layer Sheet)

A reinforcing layer sheet as in Example 1 was prepared.

(Preparation of a Decoration Layer Sheet)

A decoration layer sheet as in Example 1 was prepared.

(Preparation of a Fire-Resistant Melamine Decorative Panel: FIG. 4)

The above-obtained sheets were stacked from top to bottom in the order of 1 sheet of the decoration layer, 1 sheet of the reinforcing layer sheet, 5 sheets of the core-material layer sheet, 1 sheet of the reinforcing layer sheet, and 1 sheet of the decoration layer, and then a mirror plate of stainless steel was superposed on both sides. It was all subjected to heat-pressing at a temperature of 150° C. and a pressure of 100 kgf/cm² for 30 minutes, and thus a fire-resistant melamine decorative panel having a thickness of 3 mm was prepared.

Example 4

(Preparation of a Compound of a Fire-Resistant Phenol Resin and Loess for a Core-Material Layer)

A fire-resistant phenol resin as in Example 2 was prepared.

700 parts by weight of loess having an average particle size of 10 to 50 μm and 200 parts by weight of aluminum hydroxide having an average particle size of 10 to 50 μm were added to 100 parts by weight of the above-obtained fire-resistant phenol resin and then mixed to prepare a compound of fire-resistant phenol resin, loess, and aluminum hydroxide.

(Preparation of a Core-Material Layer Sheet)

Nonwoven fabric of E-glass fiber with a weight per unit area of 110 g/m² obtained by treatment with acryl resin-based binder was impregnated with the above compound of fire-resistant phenol resin, loess, and aluminum hydroxide and it was dried to prepare a core-material layer sheet having a degree of impregnation of 800% by weight based on dry weight.

(Preparation of a Decoration Layer Sheet)

A decoration layer sheet as in Example 1 was prepared.

(Preparation of a Fire-Resistant Melamine Decorative Panel: FIG. 5)

The above-obtained sheets were stacked from top to bottom in the order of 1 sheet of the decoration layer, 6 sheets of the core-material layer sheet, and 1 sheet of the decoration layer, and then a mirror plate of stainless steel was superposed on both sides. It was all subjected to heat-pressing at a temperature of 150° C. and a pressure of 100 kgf/cm² for 30 minutes, and thus a fire-resistant melamine decorative panel having a thickness of 3 mm was prepared.

Example 5

(Preparation of a Core-Material Layer Sheet)

A core-material layer sheet as in Example 1 was prepared.

(Preparation of a Reinforcing Layer (Fire-Resistant Kraft Layer) Sheet)

A fire-resistant kraft paper was impregnated to a weight per unit area of 300 g/m² with the fire-resistant phenol resin prepared in Example 2 and dried to prepare a fire-resistant kraft layer sheet as a reinforcing layer sheet of 80% by weight based on dry weight.

(Preparation of a Decoration Layer Sheet)

A decoration layer sheet as in Example 1 was prepared.

Figure 6:
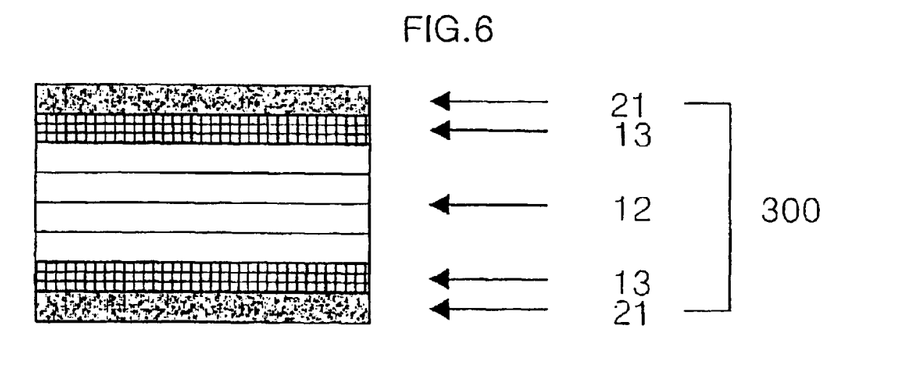
FIG. 6 a sectional view of a fire-resistant decorative panel according to the present invention, wherein loess is used.

(Preparation of a fire-resistant decorative composite panel: FIG. 6)

The above-obtained sheets were stacked from top to bottom in the order of 1 sheet of the decoration layer, 3 sheets of the core-material layer sheet, 1 sheet of the reinforcing layer (fire-resistant kraft layer) sheet, 3 sheets of the core-material layer sheet, and 1 sheet of the decoration layer, and then a mirror plate of stainless steel was superposed on both sides. The stacked sheets were then subjected to heat-pressing at a temperature of 150° C. and a pressure of 100 kgf/cm² for 30 minutes, and thus a fire-resistant decorative panel having a thickness of 4.5 mm was prepared.

Comparative Example 1

(Preparation of a Core-Material Layer Sheet)

A core-material layer sheet was prepared in the same manner as in Example 1 except that aluminum hydroxide having a particle size of 10 to 50 μm was used instead of loess as an inorganic filler.

(Preparation of a Reinforcing Layer Sheet)

A reinforcing layer sheet was prepared in the same manner as in Example 1 except that aluminum hydroxide having a particle size of 10 to 50 μm was used instead of loess as an inorganic filler.

(Preparation of a Decoration Layer Sheet)

A decoration layer sheet as in Example 1 was prepared.

(Preparation of a Fire-Resistant Melamine Decorative Panel: FIG. 4)

In the same manner as in Example 1, the above-obtained sheets were stacked from top to bottom in the order of 1 sheet of the decoration layer, 3 sheets of the core-material layer sheet, 1 sheet of the reinforcing layer sheet, 3 sheets of the core-material layer sheet, and 1 sheet of the decoration layer, and then a mirror plate of stainless steel was superposed on both sides. The stacked sheets were then subjected to heat-pressing at a temperature of 150° C. and a pressure of 100 kgf/cm² for 30 minutes, and thus a fire-resistant melamine decorative panel having a thickness of 3 mm was prepared.

The physical properties of each of the fire-resistant melamine decorative panels prepared in Examples 1 to 4 and Comparative Examples 1 were compared, and the results are summarized in the following Table 1.

TABLE 1

|  |  | Example | Example | Example | Example | Example | Comparative Example |
|---|---|---|---|---|---|---|---|
| Fire-resistance | Surface test | passed | passed | passed | passed | passed | passed |
|  | Substrate Test | passed | passed | passed | passed | passed | not passed |
| Dimensional stability 1 |  | −0.07% | −0.07% | −0.06% | −0.07% | −0.06% | −0.14% |
| Dimensional stability 2 |  | +0.15% | +0.15% | +0.14% | +0.15% | +0.04% | +0.30% |
| Thickness |  | 3 mm | 3 mm | 3 mm | 3 mm | 4.5 mm | 3 mm |

In the above table, fire-resistance data represent results of a test carried out in accordance with "Testing method for incombustibility of internal finish materials and elements of building" as set forth in KS F2271, and each of the dimensional stability data represents results of a test carried out according to "Testing method for laminated thermosetting high-pressure decorative sheets" as set forth in JIS K 6902.

The fire-resistant panel and the fire-resistant decorative panel prepared by using loess according to the present invention provides decorated plates integrally formed with a compound of a melamine resin, a phenol resin, or a modified resin, which uses a porous sheet such as a woven or nonwoven fabric made of inorganic fibers such as glass or alumina fibers, or kraft paper, and loess as main inorganic fillers, with the addition of a fire retardant. Therefore, it can be used for materials for building interiors or exteriors, material for interiors, furniture and floors, and almost no deformation is caused due to its excellent fire-resistance as well as superior dimensional stability.

What is claimed is:

1. A fire-resistant panel comprising:
   a) a substrate material of a woven or nonwoven fabric of inorganic fiber, or a paper; and
   b) a resin composition containing the following materials which are impregnated or coated onto the substrate material set forth in a):
      i) a thermosetting resin selected from the group consisting of a phenol resin, a modified phenol resin, a modified phenol-urea resin, a melamine resin, a modified melamine resin, a modified melamine-urea resin, a urea resin, and a modified urea resin; and as a main component
      ii) loess.

2. A fire-resistant panel according to claim 1, wherein the amount of the resin composition impregnated or coated is 400 to 2000 parts by weight with reference to 100 parts by weight of the substrate material.

3. A fire-resistant panel according to claim 1, wherein the resin composition comprises:
   i) 3.0% to 10.0% by weight (based on solid mass) of a first condensate of a melamine resin or a phenol resin which is produced by reaction of 25% to 45% by weight of melamine or phenol, 30% to 60% by weight of formaldehyde, 2% to 5% by weight of a plasticizer, and 10% to 25% by weight of water;
   ii) 50% to 80% by weight of loess;
   iii) 1.0% to 5.0% by weight of fire retardant; and
   iv) 10% to 40% by weight of water or alcohol as a solvent.

4. A fire-resistant panel according to claim 1, wherein the resin composition comprises:
   i) 3.0% to 10.0% by weight (based on solid mass) of a first condensate of a melamine resin or a phenol resin which is produced by reaction of 25% to 45% by weight of melamine or phenol, 30% to 60% by weight of formaldehyde, 2% to 5% by weight of a plasticizer, and 10% to 25% by weight of water;
   ii) 40% to 70% by weight of loess;
   iii) 3% to 20% by weight of one or more inorganic fillers selected from the group consisting of aluminum hydroxide, magnesium hydroxide, and talc;
   iv) 1.0% to 5.0% by weight of fire retardant; and
   v) 10% to 40% by weight of water or alcohol as a solvent.

5. A fire-resistant panel according to claim 1, wherein the loess has a particle size distribution of 5 to 300 μm and a mean particle size of 10 to 50 μm.

6. A fire-resistant panel according to claim 1, wherein production areas of the loess in Korea include Sancheong in Gyeongsangnam-do, Chongdo in Gyeongsangbuk-do, Gurye or Hwasun in Jeollanam-do, and Buan in Jeollabuk-do.

7. A fire-resistant panel according to claim 1, wherein the loess has a composition of: 10% to 90% by weight of silicon dioxide, 10% to 80% by weight of aluminum oxide, 0.1% to 50% by weight of iron oxide, 0.1% to 30% by weight of magnesium oxide, 0.1% to 50% by weight of calcium oxide, 0.1% to 30% by weight of potassium oxide, 0.1% to 5% by weight of mineral oxide and inorganic material, 0% to 5% by weight of moisture and 0.1% to 20% by weight of impurities as a remainder.

8. A fire-resistant panel according to claim 1, wherein the loess is calcined loess obtained by calcining natural loess at a temperature of 300° to 100° C.

9. A fire-resistant panel according to claim 1, wherein the substrate material is a woven or nonwoven fabric of glass fiber or alumina fiber, or kraft paper, and has a weight per unit area of 30 to 200 g/m$^2$.

10. A fire-resistant panel according to claim 1, wherein the substrate material is a nonwoven fabric of glass fiber that is made by chopping a glass fiber having a composition of E-glass with a fiber diameter of 6 to 30 μm into a length of 10 to 50 mm using a needling machine, and then by blending a binder selected from the group consisting of an epoxy resin, an acryl resin, and a polyvinyl alcohol resin with it.

11. A fire-resistant decorative panel comprising:
   a) a decoration layer formed by impregnating or coating a patterned substrate with a thermosetting resin; and
   b) a plurality of core-material layers formed by or coating a substrate material of a woven or nonwoven fabric of inorganic fiber, or a paper, with a resin composition which contains an inorganic filler having loess as a main component and a thermosetting resin composition the group consisting of a phenol resin, a modified phenol resin, a modified phenol-urea resin, a melamine resin, a modified melamine resin, a modified melamine-urea resin, a urea resin, and a modified urea resin.

12. A fire-resistant decorative panel according to claim 11, wherein a reinforcing layer formed by impregnating or coating a woven inorganic fiber fabric or kraft paper with a resin composition of a modified melamine resin or a modified phenol resin is interposed between the core-material layers and the decoration layer, or is interposed between core-material layers.

13. A fire-resistant decorative panel according to claim 11, wherein the amount of the thermosetting resin impregnated into the decoration layer is 50 to 200 parts by weight with reference to 100 parts by weight of the patterned substrate.

14. A fire-resistant decorative panel according to claim 11, wherein the thermosetting resin is selected from the group consisting of a melamine resin, a phenol resin, an acryl resin, and a urethane resin.

15. A fire-resistant decorative panel according to claim 11, wherein the patterned substrate is a paper the material of which is selected from the group consisting of synthetic pulp, wood, textile fabrics and organic synthetic fiber, and has a weight per unit area of 40 to 200 g/m$^2$.

16. A fire-resistant decorative panel according to claim 11, wherein the amount of the resin composition impregnated into the core-material layer is 400 to 2000 parts by weight with reference to 100 parts by weight of the substrate material.

17. A fire-resistant decorative panel according to claim 11, wherein the resin composition comprises:
   i) 3.0% to 10.0% by weight (based on solid mass) of a first condensate of a melamine resin or a phenol resin which is produced by reaction of 25% to 45% by weight of melamine or phenol, 30% to 60% by weight of formaldehyde, 2% to 5% by weight of a plasticizer, and 10% to 25% by weight of water;
   ii) 50% to 80% by weight of loess;
   iii) 1.0% to 5.0% by weight of fire retardant; and
   iv) 10% to 40% by weight of water or alcohol as a solvent.

18. A fire-resistant decorative panel according to claim 11, wherein the resin composition comprises:
   i) 3.0% to 10.0% by weight (based on solid mass) of a first condensate of a melamine resin or a phenol resin which is produced by reaction of 25% to 45% by weight of melamine or phenol, 30% to 60% by weight of formaldehyde, 2% to 5% by weight of a plasticizer, and 10% to 25% by weight of water;
   ii) 40% to 70% by weight of loess;
   iii) 3% to 20% by weight of an inorganic fillers selected from the group consisting of aluminum hydroxide, magnesium hydroxide, and talc;
   iv) 1.0% to 5.0% by weight of fire retardant; and
   v) 10% to 40% by weight of water or alcohol as a solvent.

19. A fire-resistant decorative panel according to claim 11, wherein the loess has a particle size distribution of 5 to 300 μm and a mean particle size of 10 to 50 μm.

20. A fire-resistant decorative panel according to claim 11, wherein production areas of the loess in Korea include Sancheong in Gyeongsangnam-do, Chongdo in Gyeongsangbuk-do, Gurye or Hwasun in Jeollanam-do, and Buan in Jeollabuk-do.

21. A fire-resistant decorative panel according to claim 11, wherein the loess has a composition of: 10% to 90% by weight of silicon dioxide, 10% to 80% by weight of aluminum oxide, 0.1% to 50% by weight of iron oxide, 0.1% to 30% by weight of magnesium oxide, 0.1% to 50% by weight of calcium oxide, 0.1% to 30% by weight of potassium oxide, 0.1% to 5% by weight of mineral oxide and inorganic material, 0% to 5% by weight of moisture and 0.1% to 20% by weight of impurities as a remainder.

22. A fire-resistant decorative panel according to claim 11, wherein the loess is calcined loess obtained by calcining natural loess at a temperature of 300° to 1000° C.

23. A fire-resistant decorative panel according to claim 11, wherein the substrate material of the core-material layer is a woven or nonwoven fabric of glass fiber or alumina fiber, or kraft paper, and has a weight per unit area of 30 to 200 g/m$^2$.

24. A fire-resistant decorative panel according to claim 23, wherein the substrate material is a nonwoven fabric of glass fiber that is made by chopping a glass fiber having a composition of E-glass with a fiber diameter of 6 to 30 μm into a length of 10 to 50 mm using a needling machine, and then by blending a binder selected from the group consisting of an epoxy resin, an acryl resin, and a polyvinyl alcohol resin with it.

25. A fire-resistant decorative panel according to claim 12, wherein the amount of the thermosetting resin impregnated into the reinforcing layer is 50 to 500 parts by weight with reference to 100 parts by weight of the substrate material.

26. A fire-resistant decorative panel according to claim 12, wherein the resin composition comprises:
   i) 3.0% to 10.0% by weight of a first condensate of a melamine resin or a phenol resin which is produced by reaction of 25% to 45% by weight of melamine or phenol, 30% to 60% by weight of formaldehyde, 2% to 5% by weight of a plasticizer, and 10% to 25% by weight of water;

ii) 1.0% to 5.0 by weight of fire retardant; and iii) 10% to 40% by weight of water or alcohol as a solvent.

27. A fire-resistant decorative panel according to claim 12, wherein the resin composition comprises:

i) 3.0% to 10.0% by weight (based on solid mass) of a first condensate of a melamine resin or a phenol resin which is produced by reaction of 25% to 45% by weight of melamine or phenol, 30% to 60% by weight of formaldehyde, 2% to 5% by weight of a plasticizer, and 10% to 25% by weight of water;

ii) 50% to 80% by weight of loess;

iii) 1.0% to 5.0% by weight of fire retardant; and iv) 10% to 40% by weight of water or alcohol as a solvent.

28. A fire-resistant decorative panel according to claim 12, wherein the resin composition comprises:

i) 3.0% to 10.0% by weight (based on solid mass) of a first condensate of a melamine resin or a phenol resin which is produced by reaction of 25% to 45% by weight of melamine or phenol, 30% to 60% by weight of formaldehyde, 2% to 5% by weight of a plasticizer, and 10% to 25% by weight of water;

ii) 40% to 70% by weight of loess;

iii) 3% to 20% by weight of an inorganic fillers selected from the group consisting of aluminum hydroxide, magnesium hydroxide, and talc;

iv) 1.0% to 5.0% by weight of fire retardant; and v) 10% to 40% by weight of water or alcohol as a solvent.

29. A fire-resistant decorative panel according to claim 12, wherein the substrate material of the reinforcing layer is a woven fabric of glass fiber or alumina fiber, and has a weight per unit area of 30 to 150 g/m$^2$.

30. A fire-resistant decorative panel according to claim 29, wherein the substrate material is woven glass fiber fabric made of glass fiber having an E-glass composition produced by means of a weaving machine.

31. A fire-resistant decorative panel according to claim 12, wherein the substrate material of the reinforcing layer is kraft paper having a weight per unit area of 70 to 300 g/m$^2$.

32. A fire-resistant decorative panel according to claim 11, wherein a rear substrate including a polyvinyl chloride (PVC) sheet, plywood, a medium density fiber board (MDF), and a high density fiber board (HDF) is further attached to the rear face.

* * * * *